United States Patent [19]
Yeo

[11] Patent Number: 5,164,156
[45] Date of Patent: * Nov. 17, 1992

[54] METHOD OF CONTROLLING WELD CHAMBER PURGE AND COVER GAS ATMOSPHERE

[75] Inventor: Denis Yeo, Columbia, S.C.

[73] Assignee: Westinghouse Electric Corp., Pittsburgh, Pa.

[*] Notice: The portion of the term of this patent subsequent to Apr. 16, 2002 has been disclaimed.

[21] Appl. No.: 668,839

[22] Filed: Mar. 13, 1991

[51] Int. Cl.$^5$ .............................................. G21C 3/00
[52] U.S. Cl. ...................................... 376/451; 376/413
[58] Field of Search ............................... 376/451, 413; 219/10.55 C, 10.81, 69 E, 69.15, 59.1

[56] References Cited

U.S. PATENT DOCUMENTS

| | | | |
|---|---|---|---|
| 3,105,864 | 10/1963 | Robinson | 13/9 |
| 3,484,575 | 12/1969 | Cunningham | 219/74 |
| 3,555,239 | 1/1971 | Kerth | 219/124 |
| 3,683,148 | 8/1972 | Boyko et al. | 219/137 |
| 3,725,635 | 4/1973 | Fink et al. | 219/121 P |
| 3,842,238 | 10/1974 | Boyko et al. | 219/137 |
| 3,988,566 | 10/1976 | Vogts et al. | 219/12 |
| 4,003,788 | 1/1977 | Boyko et al. | 176/79 |
| 4,075,454 | 12/1978 | Duncan et al. | 219/137 |
| 4,188,521 | 2/1980 | Yeo | 219/60 |
| 4,501,949 | 2/1985 | Antol et al. | 219/121 LC |
| 4,511,075 | 4/1985 | Yeo | 228/7 |
| 4,918,287 | 4/1990 | Yeo | 219/137 |

FOREIGN PATENT DOCUMENTS

| | | | |
|---|---|---|---|
| 5027418 | 2/1980 | Japan | 219/75 |
| 548396 | 4/1977 | U.S.S.R. | 219/74 |

Primary Examiner—Donald P. Walsh
Assistant Examiner—Meena Chelliah

[57] ABSTRACT

A method of controlling the gas atmosphere in a welding chamber includes detecting the absence of a fuel rod from the welding chamber and, in response thereto, initiating the supplying of a flow of argon gas to the chamber to purge air therefrom. Further, the method includes detecting the entry of a fuel rod in the welding chamber and, in response thereto, terminating the supplying of the flow of argon gas to the chamber and initiating the supplying of a flow of helium gas to the chamber to purge argon gas therefrom and displace the argon gas in the chamber. Also, the method includes detecting the withdrawal of the fuel rod from the welding chamber and, in response thereto, terminating the supplying of the flow of helium gas to the chamber and initiating the supplying of argon to the chamber to purge the air therefrom. The method also includes detecting the initiating of a weld cycle and, in response thereto, momentarily supplying a flow of argon gas to the welding electrode tip for initiating the welding arc.

9 Claims, 1 Drawing Sheet

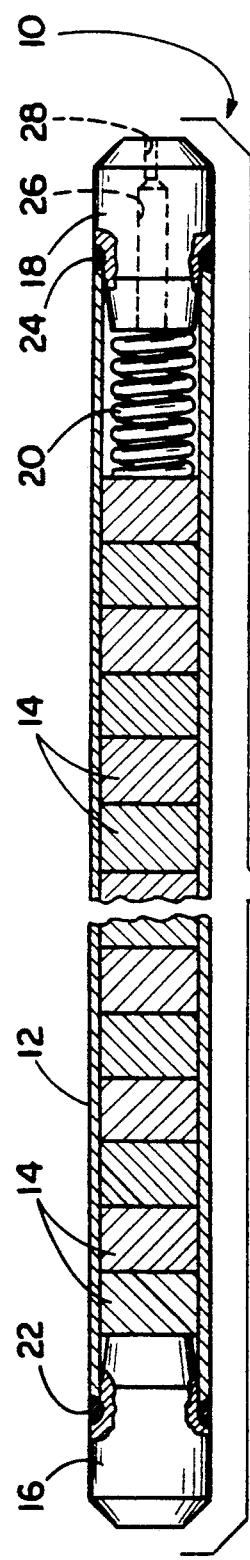
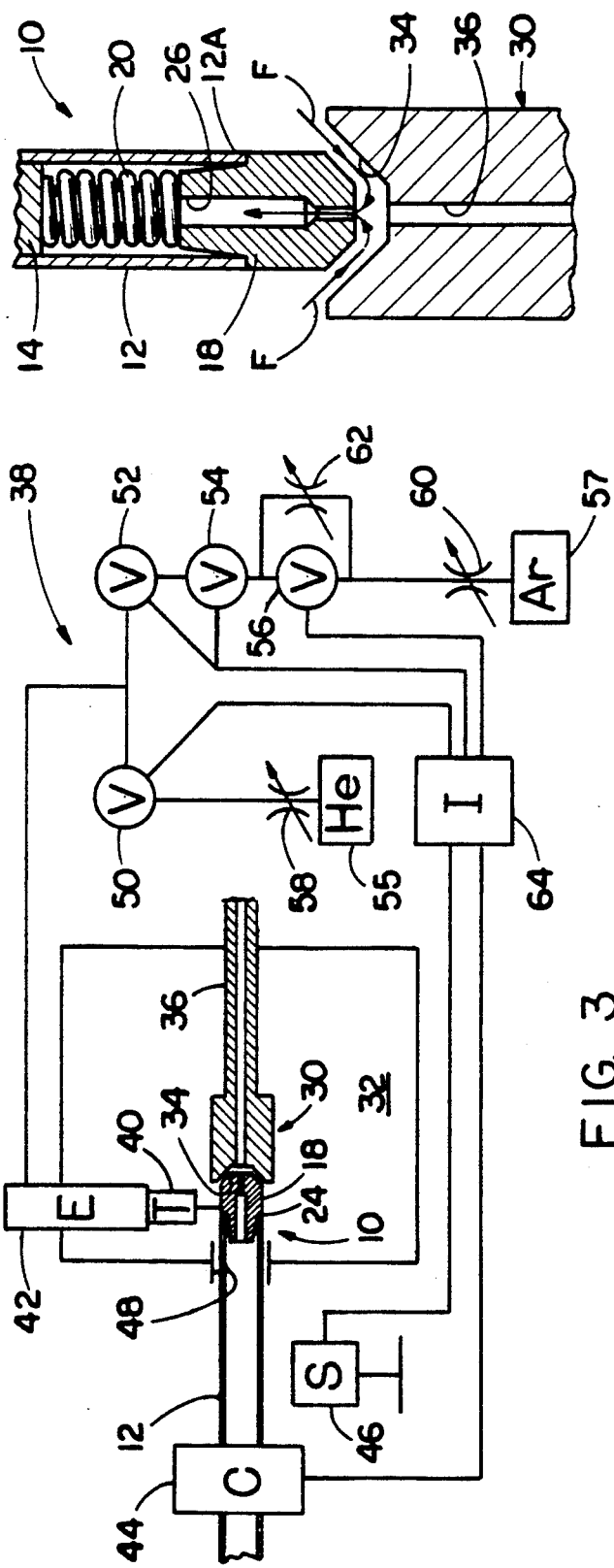
FIG. 1 (PRIOR ART)
FIG. 2 (PRIOR ART)
FIG. 3

METHOD OF CONTROLLING WELD CHAMBER PURGE AND COVER GAS ATMOSPHERE

BACKGROUND OF THE INVENTION

1. Field of the Invention

The present invention relates generally to fuel rods for a nuclear reactor and, more particularly, is concerned with a method of controlling weld chamber purge and cover gas atmosphere.

2. Description of the Prior Art

A nuclear reactor core is composed of a multiplicity of fuel assemblies with each fuel assembly comprised of a plurality of nuclear fuel rods. A typical nuclear fuel rod is manufactured by loading a plurality of nuclear fuel pellets and a plenum spring into a cladding tube and applying bottom and top end plugs to opposite ends of the cladding tube. Typically, the end plugs are welded to the ends of the tube in an atmosphere of inert gas which provides a suitable shield or cover gas for performance of arc welding. Argon, helium, and a helium-argon mixture are examples of cover gases which have been used heretofore, with helium ordinarily being the preferred cover gas. Conventional welding operations performed in the manufacture of nuclear fuel rods are disclosed in U.S. Pat. Nos. to Boyko et al (3,683,148), Fink et al (3,725,635), Boyko et al (3,842,238 and 4,003,788) and Duncan et al (4,075,454).

Argon gas has been used heretofore in purging a chamber used in girth welding of the bottom end plugs of fuel rods. However, it has not been used for purging the chamber for girth welding of the top end plugs for the reason that after girth welding is completed the argon gas would be drawn into the fuel rod through an opening axially-extending gas inlet hole in the top end plug due to a vacuum condition created in the fuel rod by the girth welding. The presence of argon in the fuel rod will cause problems subsequently because of adverse effects on the thermal conductivity of the gas mixture inside the fuel rod.

Up to the present, the solution applied has been to exclude the use of argon gas in the girth welding of top end plugs. Helium is thus present in the chamber at all times. This presents problems in terms of the high cost of such helium utilization and end plug rejections caused by occasional arc jumping.

Consequently, the need exists for improvement of the control of the gas atmosphere during girth welding of top end plugs of fuel rods.

SUMMARY OF THE INVENTION

The present invention provides a welding chamber gas atmosphere control method designed to satisfy the aforementioned needs. The control method of the present invention uses argon gas to purge the chamber and to enable the welding arc to start at a lower potential, thus saving substantial costs in helium utilization while improving the quality of girth welds for top end plugs. The method of the present invention eliminates problems formerly caused by the use of argon gas in the weld chamber.

The weld chamber gas atmosphere control method of the present invention is performed in combination with an arrangement which includes a welding chamber having an entry opening through which can be inserted a fuel rod having an end plug fitted to an end of a cladding tube of the fuel rod. The arrangement also includes a welding electrode extending into the welding chamber and being operable for generating a welding arc. Further, an endstop is disposed within the welding chamber for receiving the end plug on the fuel rod to which a girth weld is to be made by the welding electrode to attach the end plug to the end of the cladding tube of the fuel rod. The endstop is also for communicating a vacuum condition to the interior of the fuel rod through an inlet hole in the end plug to evacuate air from the fuel rod in preparation for making the girth weld. The arrangement also includes a mechanism for holding the fuel rod. The mechanism is closed when holding the fuel rod with its end plug in the welding chamber and is opened when releasing the fuel rod for withdrawal from the welding chamber.

Accordingly, the method of the present invention for controlling the gas atmosphere in the welding chamber comprises the steps of: (a) detecting the absence of a fuel rod from the welding chamber; (b) in response to the detecting of the fuel rod absence, initiating the supplying of a flow of argon gas to the chamber to purge air therefrom; (c) detecting the entry of a fuel rod in the welding chamber; (d) in response to the detecting of the fuel rod entry, terminating the supplying of the flow of argon gas to the chamber and initiating the supplying of a flow of helium gas to the chamber to purge argon gas therefrom and displace the argon gas in the chamber; (e) detecting the withdrawal of the fuel rod from the welding chamber; and (f) in response to the detecting of the fuel rod withdrawal, terminating the supplying of the flow of helium gas to the chamber and initiating the supplying of argon to the chamber to purge the air therefrom.

More particularly, the detecting steps are performed by sensing the presence or absence of the fuel rod at a entry opening of the chamber through which the fuel rod moves into and from the chamber. Also, the respective initiating and terminating of the supplying of the flow of argon gas and helium gas is performed by switching valves connected to sources of argon gas and helium gas between opened and closed positions.

The controlling method also includes detecting the initiation of a weld cycle, and, in response to the detection of weld cycle initiation, momentarily supplying a flow of argon gas to the welding electrode tip for initiating the welding arc.

Further, the detecting of the absence of the fuel rod from the chamber is performed by sensing whether the mechanism for holding the fuel rod is opened or closed.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a longitudinally foreshortened, axial sectional view of a prior art fuel rod.

FIG. 2 is an enlarged fragmentary axial sectional view of a prior art arrangement including a top end plug of a fuel rod and an endstop used during girth welding of the same.

FIG. 3 is a schematical view of an arrangement for carrying out girth welding of a top end plug of a fuel rod in accordance with the control method of the present invention.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown a prior art nuclear fuel rod, in foreshortened form and generally designated 10, to which the welding system employing the improvements of the present invention can be applied. The fuel rod 10 includes a cladding tube 12, a plurality of nuclear fuel pellets 14 in the tube 12, and bottom and top end plugs 16, 18 applied to opposite ends of the tube. Also, to maintain the pellets 14 in an end-to-end stack form in the tube, a plenum spring 20 is disposed in the tube between the pellet stack and top end plug 18.

In assembling the fuel rod 10, typically the bottom end plug 16 is applied and girth welded at 22 to one end of the tube 12 first. Then, the pellets 14 and spring 20 are loaded through the remaining open end of the tube 12. The top end plug 18 is applied last and ordinarily girth welded at 24 and then a gas inlet hole 26 in the top end plug 18 is end sealed at 28 to close and seal the fuel rod 10. An atmosphere of a suitable shield or cover gas, ordinarily an inert gas, preferably helium, is employed during performance of arc welding of the end plugs 16, 18.

Referring to FIG. 2, there is shown a prior art endstop 30 employed for supporting the top end plug 18 of the fuel rod 10 during girth welding thereof. When the fuel rod 10 enters the weld chamber 32 (FIG. 3), it is advanced until its top end plug 18 reaches a rest position against the endstop 30. The endstop 30 has a frusto-conical shaped cavity 34 which receives the similarly shaped end plug 18. A central passageway 36 in the endstop 30 aligns with the axially-extending gas inlet hole 26 in the top end plug 18. A vacuum is applied through the passageway 36 for removing air from the interior of the fuel rod 10 through the inlet hole 26 in the top end plug 18.

After completion of a girth weld 24 at the annular intersection of the end 12A of the fuel rod tube 12 and the rear facing shoulder 18A on the end plug 18, the fuel rod 10 is retracted away from the endstop 30. At that time, as represented by the flow lines F, gas surrounding the end plug 18 enters the fuel rod 10 through the inlet hole 26 in the end plug 18 due to equalization of the lower pressure at the interior of the fuel rod 10 with the higher pressure at the exterior thereof.

Weld Chamber Gas Atmosphere Control Method

Referring to FIG. 3, there is illustrated in schematical form an arrangement, generally indicated 38, for carrying out girth welding of the top end plug 18 of the fuel rod 10 in accordance with the control method of the present invention. The control method uses argon gas only to purge the weld chamber 32 and to enable a welding arc produced by a tip (T) 40 of the electrode (E) 42 to start at a lower potential so as to improve the quality of the girth weld 24 of the top end plug 18.

The illustrated arrangement 38 includes a chuck (C) 44 which opens to receive and remove the fuel rod 10 and closes to hold the fuel rod 10 with its top end plug 18 in the welding chamber 32 and in the rest position with the endstop 30. The arrangement 38 also includes a sensor (S) 46 located adjacent an entry opening 48 to the welding chamber 32 and a plurality of solenoid valves (V) 50, 52, 54 and 56 which can be switched between opened and closed positions. Also, the arrangement has He and Ar flow meters 58 and 60, 62 upstream of the respective valves 52, 54, 56. The valves 50, 52, 54, 56 are, in turn, connected to the welding electrode 42 for supplying the respective gases thereto from He and Ar sources 55 and 57 when open and blocking the supply when closed. There are two serial connected values 52, 54 solely for purposes of redundancy such that if one valve fails the other will still block flow of the argon gas to the welding chamber 32.

Further, the arrangement 38 includes an interlock (I) 64 which ensures that the argon valves 52, 54, 56 will only be opened upon the occurrence of specific conditions. The interlock 64 is interposed between the chuck 44 and sensor 46 on the one side and the valves 50, 52, 54, 56 on the other side. The interlock 64, which can be a logic circuit, controls the operation of the valves 50, 52, 54, 56 by determining whether, preferably, both the sensor 46 detects the absence of the fuel rod 10 from the welding chamber 32 and the chuck 44 is open such that a fuel rod 10 cannot be positioned in the weld chamber 32. In response to receipt of the detecting of the fuel rod absence by the sensor 46 and at the chuck 44, the interlock 64 permits the appropriate valves 52, 54, 56 to be switched open, such as manually, to initiate the supplying of a flow of argon gas to the chamber 32 to purge air therefrom On the other hand, when the sensor 46 detects the entry of a fuel rod 10 through the entry opening 48 of the welding chamber 32 by sensing the instance of the presence of the fuel rod through the entry opening, the, interlock 64 will cause the appropriate ones of the valves 52, 54, 56 to switch closed, terminating the supplying of the flow of argon gas to the chamber. At the same time the switching open of the valve 50 will be enabled for initiating the supplying of a flow of helium gas to the chamber to purge argon gas therefrom and displace the argon gas in the chamber 32 during welding of the girth weld 24 and the cooling thereof. Finally, upon the detecting of the instance of absence or withdrawal of the fuel rod 10 from the entry opening of the welding chamber 32 by the sensor 46 or at the chuck 44, the interlock will cause the termination of the supplying of the flow of helium gas to the chamber 32 and enable the initiating of the supplying of argon to the chamber 32 to purge the air therefrom, thus saving the costly use of any more helium.

Also, the initiation of the weld cycle is detected and in response thereto the valves 52, 54 are momentarily switched opened for supplying a flow of argon gas to the welding electrode tip for initiating the welding arc. Preferably, the valves are opened for approximately 1-2 seconds. The amount of argon flow for arc initiation is controlled by the flow meter 62. A much higher rate of flow of argon is normally permitted by the flow meter 60 than by the flow meter 62.

It will be understood that the valve 50 is opened, and the other valves 52, 54, 56 are closed, and solely helium is supplied to the chamber 32, when the fuel rod 10 is detected within the chamber 32. Thus, when the vacuum is imposed in the passageway 36 and communicated to the interior of the fuel rod 10 and later when the vacuum is terminated and the inlet hole 26 is uncovered, only helium can enter the fuel rod 10 during equalization of the interior pressure of the fuel rod with the exterior pressure in the welding chamber 32. However, the higher-cost helium gas only flows so long as it is needed. The argon gas is then supplied for performance of purging.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In combination with a welding chamber having an entry opening through which can be inserted and withdrawn a fuel rod having an end plug fitted to an end of a cladding tube of the fuel rod, a sensor located adjacent the entry opening to the welding chamber and being operable for sensing the instance of the presence or absence of a fuel rod through or from the entry opening, a welding electrode extending into the welding chamber and being operable for generating a welding arc, and an endstop disposed within the welding chamber for receiving the end plug on the fuel rod to which a girth weld is to be made by the welding electrode to attach the end plug to the end of the cladding tube of the fuel rod, the endstop also for communicating a vacuum condition to the interior of the fuel rod through an inlet hole in the end plug to evacuate air from the fuel rod in preparation for making the girth weld, a method of controlling the gas atmosphere in the welding chamber, comprising the steps of:

(a) detecting the absence of a fuel rod from the welding chamber by sensing the instance of the absence of the fuel rod from the entry opening;
   (b) in response to said detecting of the instance of the fuel rod absence, initiating the supplying of a flow of argon gas to the chamber to purge air therefrom;
   (c) detecting the entry of a fuel rod in the welding chamber by sensing the instance of the presence of the fuel rod through the entry opening;
   (d) in response to said detecting of the instance of the presence of the fuel rod through the entry opening, terminating the supplying of the flow of argon gas to the chamber and initiating the supplying of a flow of helium gas to the chamber to purge argon gas therefrom and displace the argon gas in the chamber;
   (e) detecting the withdrawal of the fuel rod from the welding chamber by sensing the instance of the absence of the fuel rod from the entry opening; and
   (f) in response to said detecting of the instance of the fuel rod absence from the entry opening, terminating the supplying of the flow of helium gas to the chamber and initiating the supplying of argon to the chamber to purge the air therefrom.

2. The method as recited in claim 1, wherein said respective initiating and terminating of the supplying of the flow of argon gas and helium gas is performed by switching valves connected to sources of argon gas and helium gas between opened and closed positions.

3. The method as recited in claim 1, further comprising:

detecting the initiation of a weld cycle; and
   in response to said detection of weld cycle initiation, momentarily supplying a flow of argon gas to the welding electrode tip for initiating the welding arc.

4. The method as recited in claim 1 in combination with a mechanism for holding the fuel rod, the mechanism being closed when holding the fuel rod with its end plug in the welding chamber and being opened when releasing the fuel rod for withdrawal from the welding chamber, wherein said detecting of the absence of the fuel rod from the chamber is also performed by sensing whether the mechanism for holding the fuel rod is opened or closed.

5. The method as recited in claim 4, wherein said detecting of the absence of the fuel rod from the chamber is performed by both sensing the presence or absence of the fuel rod at an entry opening of the chamber and by sensing whether the mechanism for holding the fuel rod is opened or closed.

6. In combination with a welding chamber having an entry opening through which can be inserted and withdrawn a fuel rod having an end plug fitted to an end of a cladding tube of the fuel rod, a sensor located adjacent the entry opening to the welding chamber and being operable for sensing the instance of the presence or absence of a fuel rod through or from the entry opening, a welding electrode extending into the welding chamber and being operable for generating a welding arc, an endstop disposed within the welding chamber for receiving the end plug on the fuel rod to which a girth weld is to be made by the welding electrode to attach the end plug to the end of the cladding tube of the fuel rod, the endstop also for communicating a vacuum condition to the interior of the fuel rod through an inlet hole in the end plug to evacuate air from the fuel rod in preparation for making the girth weld, and a mechanism for holding the fuel rod, the mechanism being closed when holding the fuel rod with its end plug in the welding chamber and being opened when releasing the fuel rod for withdrawal from the welding chamber, a method of controlling the gas atmosphere in the welding chamber, comprising the steps of:

(a) detecting the absence of a fuel rod from the welding chamber by sensing the instance of the absence of the fuel rod from the entry opening;
   (b) in response to said detecting of the instance of the fuel rod absence, initiating the supplying of a flow of argon gas to the chamber to purge air therefrom;
   (c) detecting the entry of a fuel rod in the welding chamber by sensing the instance of the presence of the fuel rod through the entry opening;
   (d) in response to said detecting of the instance of the presence of the fuel rod through the entry opening, terminating the supplying of the flow of argon gas to the chamber and initiating the supplying of a flow of helium gas to the chamber to purge argon gas therefrom and displace the argon gas in the chamber;
   (e) detecting the initiation of a weld cycle;
   (f) in response to said detection of weld cycle initiation, momentarily supplying a flow of argon gas to the welding electrode tip for initiating the welding arc;
   (g) detecting the withdrawal of the fuel rod from the welding chamber by sensing the instance of the absence of the fuel rod from the entry opening; and
   (h) in response to said detecting of the instance of the fuel rod absence from the entry opening, terminating the supplying of the flow of helium gas to the chamber and initiating the supplying of argon to the chamber to purge the air therefrom.

7. The method as recited in claim 6, wherein said respective initiating and terminating of the supplying of the flow of argon gas and helium gas is performed by switching valves connected to sources of argon gas and helium gas between opened and closed positions.

8. The method as recited in claim 6, wherein said detecting of the absence of the fuel rod from the chamber is also performed by sensing whether the mechanism for holding the fuel rod is opened or closed.

9. The method as recited in claim 6, wherein said detecting of the absence of the fuel rod from the chamber is performed by both sensing the presence or absence of the fuel rod at an entry opening of the chamber and by sensing whether the mechanism for holding the fuel rod is opened or closed.

* * * * *